United States Patent
Jun et al.

(10) Patent No.: US 8,174,162 B2
(45) Date of Patent: May 8, 2012

(54) MOTOR AND WASHING MACHINE USING THE SAME

(75) Inventors: Cha Seung Jun, Gyeonggi-do (KR); Byoung Wook Min, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 770 days.

(21) Appl. No.: 12/235,728

(22) Filed: Sep. 23, 2008

(65) Prior Publication Data
US 2009/0107186 A1    Apr. 30, 2009

(30) Foreign Application Priority Data
Oct. 31, 2007  (KR) .................. 10-2007-0110523

(51) Int. Cl.
H02K 1/06    (2006.01)
H02K 1/18    (2006.01)
H02K 1/28    (2006.01)
H02K 1/04    (2006.01)

(52) U.S. Cl. ............ 310/216.121; 68/140; 310/216.113; 310/216.114; 310/216.115; 310/216.116; 310/216.117; 310/216.118; 310/216.119; 310/216.122; 310/216.123; 310/216.124; 310/216.125; 310/216.126; 310/216.127

(58) Field of Classification Search ............ 68/140; 310/216.113–216.127
See application file for complete search history.

(56) References Cited

U.S. PATENT DOCUMENTS

| | | | | |
|---|---|---|---|---|
| 6,131,422 | A | * | 10/2000 | Skrippek et al. ............... 68/140 |
| 6,681,602 | B2 | * | 1/2004 | Heyder et al. .................. 68/140 |
| 7,956,501 | B2 | * | 6/2011 | Jun et al. ...................... 310/67 R |
| 2003/0132675 | A1 | * | 7/2003 | Kwon et al. ..................... 310/86 |
| 2005/0140232 | A1 | * | 6/2005 | Lee et al. ................. 310/156.26 |
| 2005/0200225 | A1 | | 9/2005 | Kim et al. |
| 2006/0059955 | A1 | * | 3/2006 | Kim ............................... 68/3 R |
| 2006/0091754 | A1 | | 5/2006 | Kim et al. |
| 2006/0191301 | A1 | | 8/2006 | Park et al. |
| 2007/0017261 | A1 | | 1/2007 | Chang et al. |
| 2008/0264114 | A1 | | 10/2008 | Jang et al. |

FOREIGN PATENT DOCUMENTS

| | | |
|---|---|---|
| KR | 1020040010795 | 1/2004 |
| KR | 1020060031281 | 4/2006 |
| KR | 1020060031287 | 4/2006 |

OTHER PUBLICATIONS

U.S. Appl. No. 12/235,760 to Jun et al, filed Sep. 23, 2008.

* cited by examiner

*Primary Examiner* — Michael Barr
*Assistant Examiner* — Charles W Kling
(74) *Attorney, Agent, or Firm* — McKenna Long & Aldridge LLP

(57) ABSTRACT

Disclosed is a washing machine which includes a tub which holds laundry, a drum which is disposed in and rotates within the tub, a stator which is fixed to the tub, and a rotor which is fixed to the drum. The rotor includes a frame, a bushing installed on the frame, a motor shaft having an end which is inserted in and fixed to the bushing, a bearing interposed between the motor shaft and the tub, and at least one guide disposed between the motor shaft and the bushing at an end of the bushing.

7 Claims, 4 Drawing Sheets

MOTOR AND WASHING MACHINE USING THE SAME

This application claims the benefit of Korean Application No. 10-2007-0110523, filed on Oct. 31, 2007, which is hereby incorporated by reference in its entirety.

BACKGROUND

The present invention relates to a motor and a washing machine using the same.

A washing machine is an apparatus that washes laundry using washing water and friction. Recently, drum-type washing machines have become popular. In a drum-type washing machine, laundry is held in a drum which lies sideways, and when the drum is rotated, laundry is raised and dropped. The opening of the drum is located at the front of the washing machine. To support the drum, a motor shaft which connects to the drum and its connection must be reliable.

Some drum-type washing machines use outer rotor-type motors. The motor is disposed at the rear of a tub, and includes a stator which is fixed to the tub and a rotor which is connected to the drum. The rotor is fixed to a frame by means of a separate bushing, and the motor shaft is fixed to the bushing. The motor shaft is inserted in and rotatably supported by the bushing, passes through the tub, and is fixed to the drum.

If the bushing is made of a resin material, the concentricity of the motor shaft can be compromised by the bushing wearing over time, especially if a length of the motor shaft which is supported by the bushing is short. While a simple way to improve the reliability of the motor shaft may be to lengthen the amount of the motor shaft which is in contact with the bushing, this contact area cannot be lengthened indefinitely.

When the motor shaft is not firmly supported by the bushing, the clearance between the motor shaft and the bushing increases so that the angle between the motor shaft and the bushing is slightly offset. The offset causes a drop in concentricity and an increase in eccentricity of the bushing and motor shaft. Thus, when there is a predetermined clearance between the motor shaft and bushing, there is a greater eccentricity between the rotor fixed to the end of the motor shaft and the stator when the motor rotates.

An increased eccentricity means that even when the motor shaft is supported by the bushing, it can move differently from the bushing, so that the rotation of the motor can lead to an abnormal rotation of the tub and drum, which can cause vibration and noise during operation of the washing machine. This is especially true for the rotor, whose eccentricity (caused by eccentricity of the motor shaft) will cause increased vibration and noise during operation of the motor.

Also, if an clearance between the motor shaft and bushing increases, or an unevenness of the clearance increases so that the position of the rotor is not firmly supported, a signal from a Hall sensor that is installed on the stator is not properly detected, leading to faulty outputs of motor control algorithms and ultimately, to the washing machine operating incorrectly due to defective operation of the motor.

SUMMARY

One of the features of the present invention is a motor having a minimal clearance between a motor shaft and a bushing, and thereby, a high concentricity between the motor shaft and the bushing, allowing an accurate Hall sensor measurement and accurate control. Another feature of the present invention is that a connection between the bushing and the motor shaft can remain firm even after a prolonged period of use.

These features may be achieved by a motor which includes a stator, and a rotor, where the rotor includes a frame, a bushing installed on the frame, a motor shaft having an end which is inserted in and fixed to the bushing, a fastening member which is inserted in the end of the motor shaft to fasten the motor shaft to the bushing, and an outer fastening guide which is interposed between the fastening member and the end of the motor shaft.

A portion of the outer fastening guide may be interposed between a head portion of the fastening member and an end surface of the motor shaft. A portion of the outer fastening guide may be interposed between a portion of a shaft of the fastening member and a portion of an inner surface of the motor shaft. A portion of the outer fastening guide may be inserted in the end of the motor shaft.

A portion of the fastening member may be inserted in a hole in an end surface of the motor shaft. A portion of the outer fastening guide may be disposed between a portion of the end of the motor shaft and a portion of the bushing. The outer fastening guide may be injection molded with the bushing.

The motor may also include a inner fastening guide disposed at a side of the bushing opposite to a side at which the fastening member is disposed, a portion of the inner fastening guide being interposed between a portion of the motor shaft and a portion of the bushing. The outer fastening guide may be a doughnut-shaped cap, provided over the end of the motor shaft between the bushing, which is fitted between the bushing and the motor shaft.

There is also provided a motor which includes a stator and a rotor, where the rotor includes a frame, a bushing installed on the frame, a motor shaft having an end which is inserted in and fixed to the bushing, the end of the motor shaft including a stepped portion, a fastening member which is inserted in the end of the motor shaft to fasten the motor shaft to the bushing, and a fastening guide disposed at the stepped portion of the motor shaft between a portion of the bushing and an outer circumferential surface of the motor shaft.

The stepped portion of the motor shaft may limit a length of insertion of the motor shaft into the bushing. The fastening guide may be injection molded with the bushing. The fastening guide may include a bearing guide that abuts a bearing, and a bushing guide that securely fits in the bushing.

There is also provided a washing machine which includes a tub which holds laundry, a drum which is disposed in and rotates within the tub, a stator which is fixed to the tub, and a rotor which is fixed to the drum, where the rotor includes a frame, a bushing installed on the frame, a motor shaft having an end which is inserted in and fixed to the bushing, a bearing interposed between the motor shaft and the tub, and at least one guide disposed between the motor shaft and the bushing at an end of the bushing.

The guide may be injection molded with the bushing. The washing machine may also include a fastening member which fastens the motor shaft to the bushing. The guide may be disposed between the bearing and the bushing, and a portion of the guide may be inserted into the bushing to support the motor shaft.

A serrated portion may be formed on an outer circumference of the motor shaft and a serrated portion may be formed on an inner circumference of the bushing. The guide may be a doughnut-shaped cap, provided over the end of the motor shaft between the bushing, which is fitted between the bushing and the motor shaft. The guide may be a bearing guide that abuts a bearing, and a bushing guide that securely fits in the bushing.

The details of one or more embodiments are set forth in the accompanying drawings and the description below. Other features will be apparent from the description and drawings, and from the claims. Additional advantages and features of the invention will be set forth in part in the description which follows and in part will become apparent to those having ordinary skill in the art upon examination of the following or may be learned from practice of the invention.

DETAILED DESCRIPTION OF THE EMBODIMENTS

A detailed description of exemplary embodiments of the present invention is provided below with reference to the accompanying drawings. However, the spirit of the present invention is not limited to these embodiments, and other embodiments that can be arrived at through addition, modification, and/or deletion of elements, also fall within the scope of the present invention.

Figure 1:
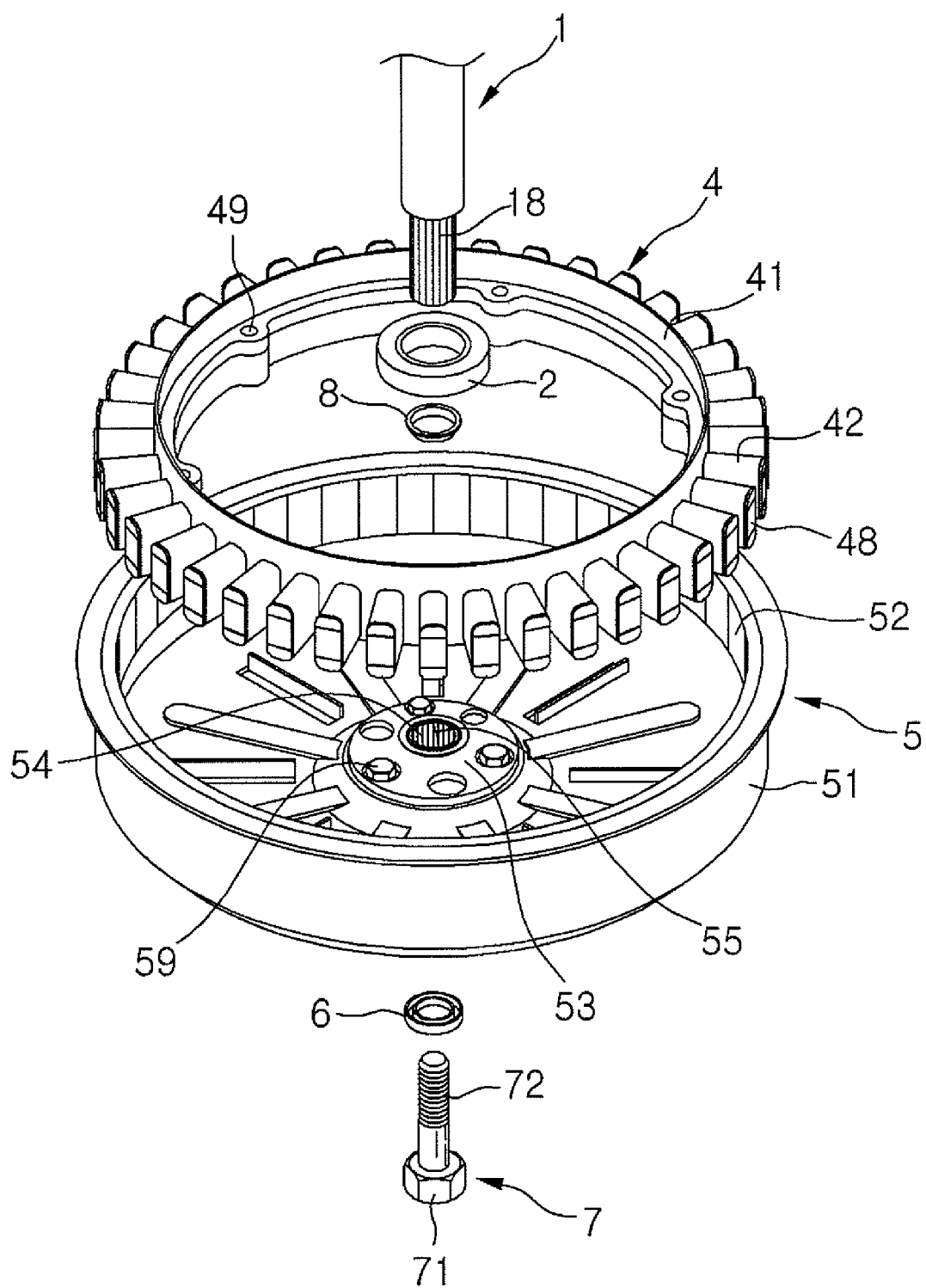
FIG. 1 is an exploded perspective view of a motor according to an exemplary embodiment of the present invention.

FIG. 1 is an exploded perspective view of a motor according to an exemplary embodiment of the invention.

The motor shown in FIG. 1 includes a stator 4 which is fixed to a rear surface of a tub, a rotor 5 which is disposed a predetermined distance from the outside of the stator 4, and a metal motor shaft 1 having ends which are fixed to the rotor 5 and a drum.

In the present embodiment, additional parts are used for fastening the above-described components, and a description of the additional parts will be provided in more detail below.

First, the portion where the motor shaft 1 couples to the rotor 5 will be described in detail. The motor shaft 1 is inserted in a bushing 53 provided on the rotor 5. A fastening member 7 is inserted into the end of the motor shaft 1 that inserts into the bushing 53, to support the motor shaft 1. The end of the fastening member 7 catches on the bushing 53 so that the motor shaft 1 does not disengage.

To prevent rotational slippage between the bushing 53 and rotor 5 when the bushing 53 is inserted over the motor shaft 1, a serrated portion 18 is formed on the outer circumference of the motor shaft 1, extending along the axis of the shaft, and a serrated portion 54 is formed in an outer circumference of a hole 55 in the bushing 53 in which the motor shaft 1 is inserted. Each of the serrated portions 18 and 54 is provided so that the gaps between their serrations are mutually the same, and contacting regions of the respective serrated portions 18 and 54 are provided with predetermined angles to facilitate insertion after being aligned. This angle causes a slight contacting shock between the motor shaft 1 and the bushing 53 when the rotor 5 is rotating. When the shocks are persistent, the bushing 53 undergoes deformation, which can be seen to be greatest at the sides of the bushing 53. The reason for this is that when the bushing 53 is yawing, the areas with the greatest amount of movement are those at the ends of the hole 55 where the motor shaft 1 is disposed.

In order to prevent shock between the motor shaft 1 and the bushing 53, and a resultant deformation of the sides of the bushing 53, fastening guides 6 and 8 are provided between the bushing 53 and the motor shaft 1 at the ends of the hole 55.

An outer fastening guide 6, which may be made of metal, is disposed at an end of the motor shaft 1 and at a first end of the hole 55, between the motor shaft 1 and the bushing 53, to improve the concentricity of the motor shaft 1 and support the connection between the motor shaft 1 and the bushing 53. An inner fastening guide 8, which may also be made of metal, is provided around the motor shaft 1, at a second end of the hole 55, between the motor shaft 1 and the bushing 53, to firmly support the connection between the motor shaft 1 and the bushing 53.

Figure 2:
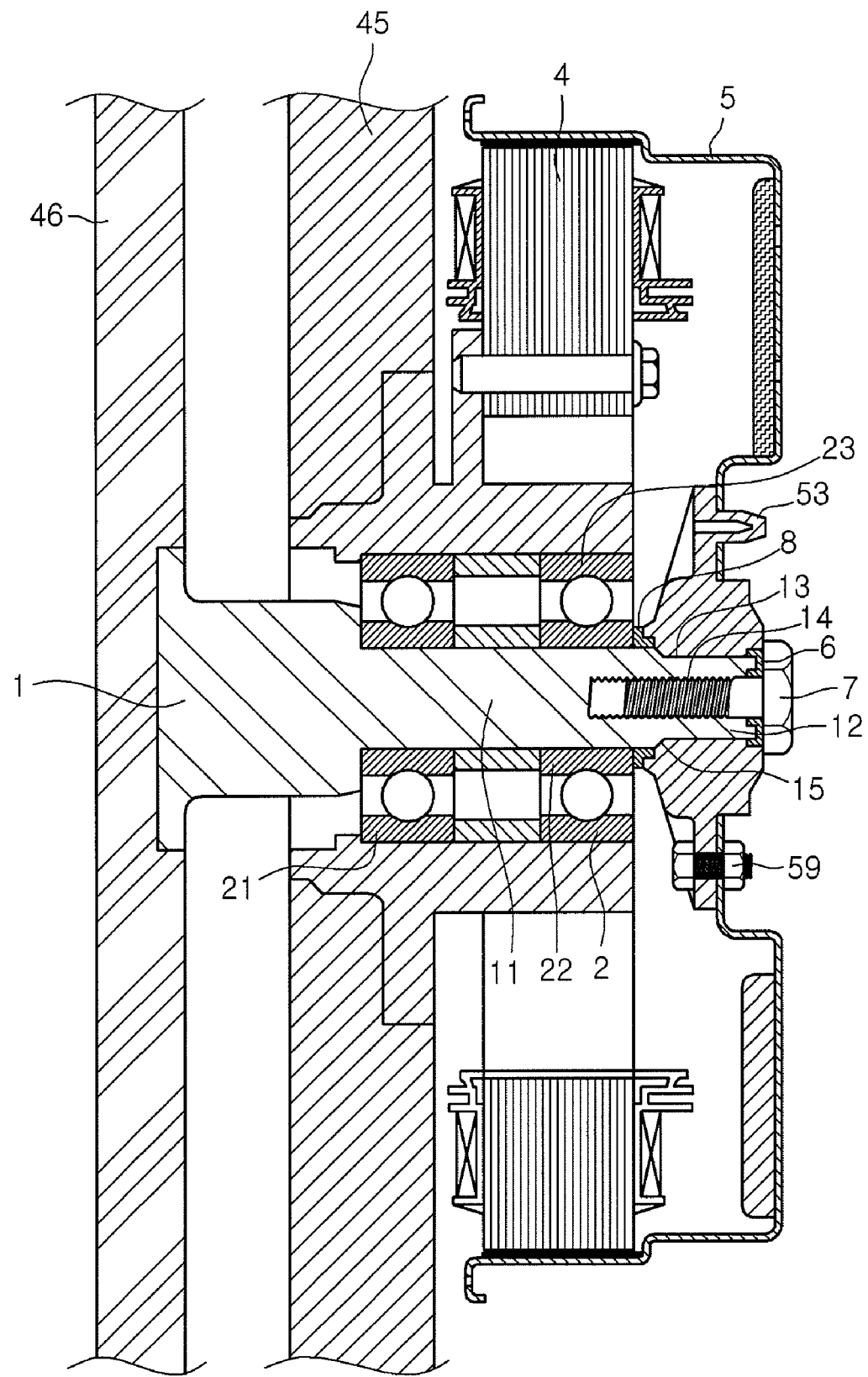
FIG. 2 is sectional view of a motor, a drum and a tub of a washing machine, according to an exemplary embodiment of the present invention.

To securely support the motor shaft 1 and the tub 45 when the motor shaft 1 rotates, a bearing 2 is interposed between the outer surface of the motor shaft 1 and the tub 45 (as shown in FIG. 2, described below).

One or more screws may be used to secure the stator 4 to the rear surface of the tub. These screws may pass through one or more fastening holes 49 provided on a stator core 41 of the stator 4. A plurality of teeth 48 are provided around the outer circumference of the stator core 41, and a stator coil 42 is wound around the teeth 48.

The rotor 5 is disposed around the outside of the stator 4. The rotor 5 includes a round frame 51, the above-described bushing 53, which is mounted at the approximate center of the frame 51, and a permanent magnet 52 disposed on the inner perimeter of the frame. The bushing 53 may be a separate component which is fixed to the frame 51. Alternatively, the bushing 53 may be injection molded into the frame 51. The permanent magnet 52 is provided in a number corresponding to the number of teeth 48, and generates electromagnetic power by interacting with the stator coil 42.

A fastening member 7, which fastens the motor shaft 1 to the bushing 53, is inserted into an inserting end of the motor shaft 1, which inserts into the bushing 53. The fastening member 7 includes a shaft 72 which is inserted in the motor shaft 1, and a head portion 71 which prevents the motor shaft 1 from disengaging from the bushing 53 in an upward direction (as shown in FIG. 1). Even when there is a certain amount of yaw in the inserted end of the motor shaft 1, the outer fastening guide 6 firmly supports the inserted end of the motor shaft 1 so that the contacting ends of the bushing 53 and motor shaft 1 do not move, thereby ensuring that concentric offset between the motor shaft and bushing does not occur even after extended use. Of course, this also reduces vibration noise and prevents controlling errors induced by rotation positional sensor errors.

The operation of the motor is described below.

First, control signals in accordance with a controlling process of the washing machine are input to the stator coil 42. An electromagnetic field is generated by the stator coil 42 when power is applied thereto, and the permanent magnet 52 generates a rotational force through attracting and repelling elements of the electromagnetic field generated by the stator coil 42 and the magnetic field of the permanent magnet 52. Because the permanent magnet 52 is fixed to the frame 51, the rotor 5 rotates, as well as the motor shaft 1, which is coupled thereto by the bushing 53.

The fastening guides 6 and 8 improve the concentricity of the motor shaft 1 and the bushing 53, allowing the rotor 5 and motor shaft 1 to rotate without vibration or noise. Also, because the rotor 5 can rotate without yawing, the rotational state of the rotor 5 can be more accurately determined by a Hall sensor installed on the stator 4. As the rotational state of the rotor 5 is used to control the current which is supplied to the stator coil 42, a more accurate rotational state determination enables the rotation of the rotor 5 to be more precisely controlled. The motor shaft 1 is supported by the tub 45 and fixed to a drum 46, and as the motor shaft 1 rotates, it rotates the drum 46.

FIG. 2 is sectional view of a motor, a drum and a tub of a washing machine, according to an exemplary embodiment of the present invention.

The motor shaft 1 is inserted in and fixed to the bushing 53, and the fastening member 7 is inserted in the inserted end of the motor shaft 1, to prevent the motor shaft 1 from disengaging from the bushing 53. The shaft 72 of the fastening member 7 is inserted inside the motor shaft 1. A diameter of the head portion 71 of the fastening member 7 is larger than a diameter of the inserted end of the motor shaft 1, in order for it to catch on the bushing 53 and fix the motor shaft 1 to the bushing 53, preventing disengaging thereof.

The motor shaft 1 includes a large diameter portion 11, a small diameter portion 12, and a stepped portion 15 between the large diameter portion 11 and the small diameter portion 12. The small diameter portion 12 is inserted in the hole 55 of the bushing 53. As diameters of the stepped portion 15 and the large diameter portion 11 are larger than a diameter of the hole 55, the stepped portion 15 and large diameter portion 11 prevent the motor shaft 1 from inserting further into the bushing 53 and thus limit a length of insertion of the motor shaft 1 into the bushing 53.

The motor shaft 1 and the bushing 53 in the above configuration are firmly fastened together, and a first bearing 21 and a second bearing 2 are provided between the motor shaft 1 and the tub 45, to allow the motor shaft 1 to rotate while being supported by the tub 45.

To firmly support the bushing 53 and the motor shaft 1, the inner circumference of the inner fastening guide 8 is the same as that of the first bearing 21, and the inner fastening guide 8 includes a bearing guide 81 which abuts a ring-shaped portion of a side of the bushing 53. The first bearing 21 includes an inner driven part 22 which supports the motor shaft 1, and an outer driven part 23 is mounted to the tub 45. The inner driven part 22 is able to rotate within the outer driven part 23, which allows the motor shaft 1 to rotate within the tub 45, yet be supported by the tub 45. The inner portion of the inner fastening guide 8 is provided in the same manner as the inner circumference of the inner driven part 22, so that the inner fastening guide 8 can securely rotate together with the motor shaft 1.

Figure 4:
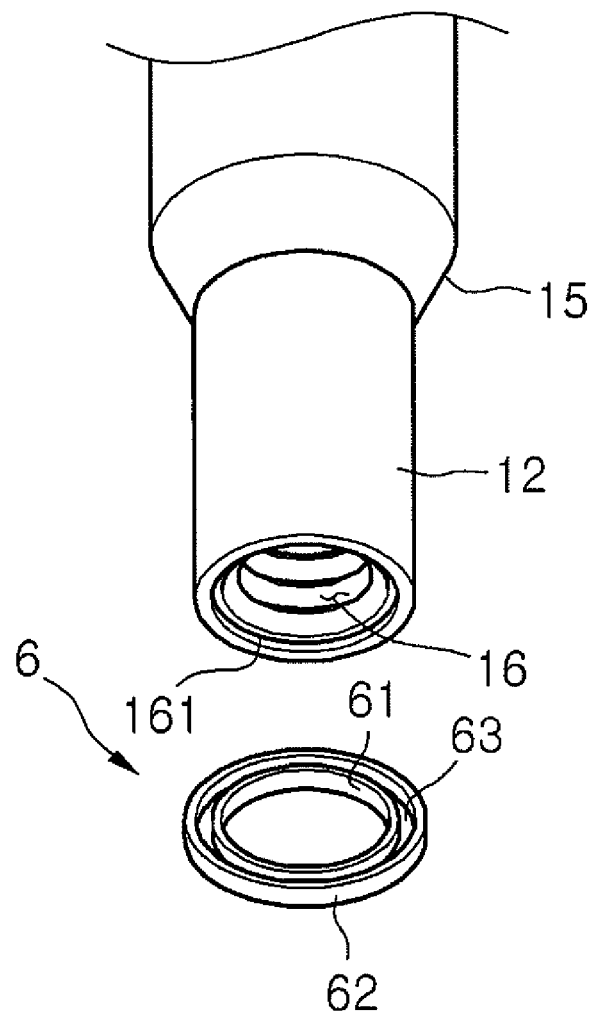
FIG. 4 is a perspective view showing how an outer fastening guide and its surrounding area are fastened, according to an exemplary embodiment of the present invention.

The shaft 72 of the fastening member 7 may include a screw portion, and a screw-shaped groove 16 may be provided within the small diameter portion 12 of the motor shaft 1, as shown in FIG. 4, to receive the shaft 72 of the fastening member 7, and tightly couple the fastening member 7 to the motor shaft 1. Preferably, when the fastening member 7 is fully inserted into the motor shaft 1, the end of the shaft 72 extends at least to the inner fastening guide 8.

The inner fastening guide 8 is securely fitted between the motor shaft 1, the bushing 53 and the inner driven part 22 of the second bearing 2. The outer fastening guide 6 is securely fitted between the motor shaft 1, the bushing 53, and the fastening member 7.

The structure and function of the inner fastening guide 8 and the outer fastening guide 6 are described below, with reference to the drawings.

Figure 3:
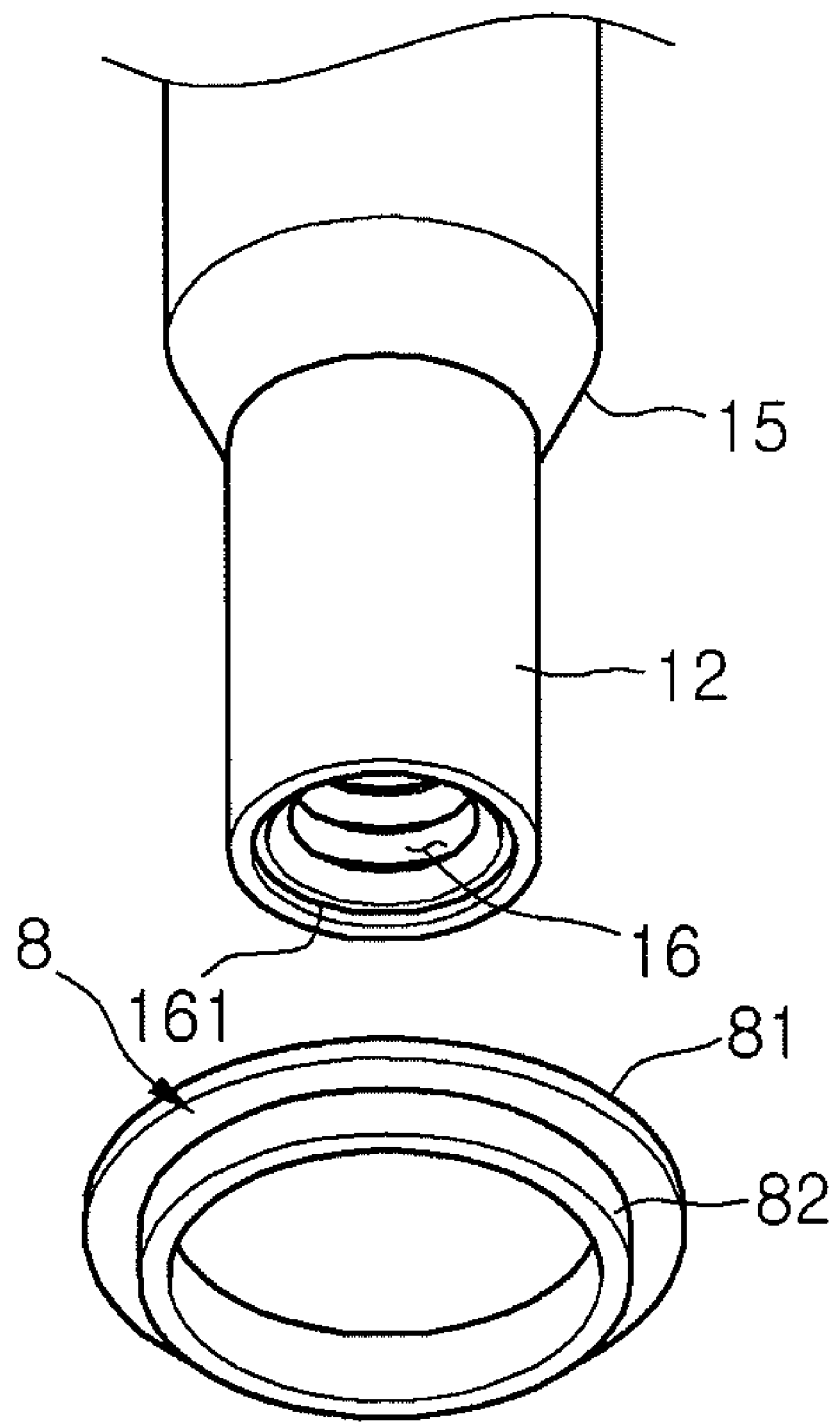
FIG. 3 is a perspective view showing how an inner fastening guide and its surrounding area are fastened, according to an exemplary embodiment of the present invention.

FIG. 3 is a perspective view showing how an inner fastening guide 8 and its surrounding area may be fastened, according to an exemplary embodiment of the invention.

Referring to FIG. 3, the inner fastening guide 8 includes a bearing guide 81 formed in the shape of a ring, which abuts the inner driven part 22 of the bearing 2, and a bushing guide 82 formed in the shape of a ring. An inner diameter of the bushing guide 82 is approximately the same as the outer diameter of the large diameter portion 11 of the motor shaft 1, so as to allow the motor shaft 1 to securely fasten to the inner fastening guide 8 when inserted in the inner fastening guide 8. The dimensions of the bushing guide 82 are also set to allow the bushing guide 82 to securely fit within a hole in the bushing 53, and support the bushing 53. As a result, the inner fastening guide 8, the bushing 53, and the motor shaft 1 may be securely fitted together. Of course, the size and shape of the bushing guide 82 is not limited to that shown in FIG. 3. Further, when manufacturing the motor, these components may be secured together by tightening the fastening member 7.

FIG. 4 is a perspective view showing how an outer fastening guide 6 and its surrounding area are fastened, according to an exemplary embodiment of the invention.

Referring to FIG. 4, the outer fastening guide 6 is provided as a doughnut-shaped cap over the end of the motor shaft 11, and includes a bushing guide 62 which is interposed between an inner surface of a hole in a side of the bushing 53, and an outer surface of the end of the motor shaft 1. The outer fastening guide 6 also includes a bolt guide 63, which is interposed between a ring forming an end surface of the motor shaft 1, and the head portion 71 of the fastening member 7. The outer fastening guide 6 also includes a motor shaft guide 61 which is interposed between a ledge 161 formed on the interior of the end of the motor shaft 1, and the outer surface of the shaft 72 of the fastening member 7.

The bushing guide 62 firmly secures the bushing 53 to the motor shaft 1, and maintains a firm concentricity of the motor shaft 11 after prolonged use. The motor shaft guide 61 and the bolt guide 63 not only support the fastening member 7 and bushing guide 62, but also firmly secure the fastening member 7 and the motor shaft 1.

As described above, the fastening guides 6 and 8 firmly secure the bushing 53 to the motor shaft 11 and the fastening member 7. Further embodiments of the fastening guides are described below.

Figure 5:
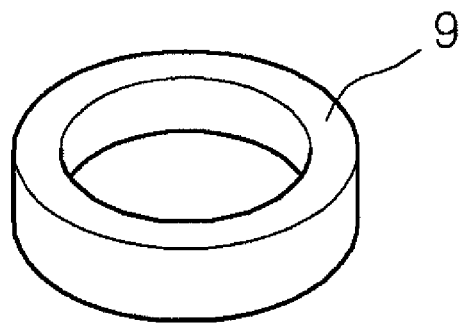
FIG. 5 is a perspective view of a fastening guide according to another exemplary embodiment of the present invention.

FIG. 5 is a perspective view of a fastening guide according to another exemplary embodiment of the invention.

FIG. 5 illustrates a fastening guide 9 which is formed in the shape of an elongated cylinder. The fastening guide 9 may be provided only between surfaces of the bushing 53 and the motor shaft 1, to reinforce and protect the bushing 53, and to couple the bushing 53 to the motor shaft 1. That is, the fastening guide 9 may be inserted within the bushing 53, and the motor shaft 11 may be inserted within the fastening guide 9.

Although embodiments have been described with reference to a number of illustrative embodiments thereof, it should be understood that numerous other modifications and embodiments can be devised by those skilled in the art that will fall within the spirit and scope of the principles of this disclosure.

For example, the illustrated embodiments include both inner and outer fastening guides. However, in alternative embodiments, only one of these fastening guides may be used. Of course, if both inner and outer fastening guides are used, the invention can more effectively prevent vibration and noise and detect the rotor rotation Also, while in the above-discussed embodiment, the bushing is made of resin and the motor shaft is made of metal, other materials may be used. For example, a metal serrated portion may be provided on the inside of the bushing. However, if a metal serrated portion is provided, in order to allow for smooth insertion of both serrated portions, a predetermined gap should be provided between the respective serrated portions, so that a certain amount of yaw in the motor shaft and rotor is inevitable. Further, using a fastening guide made with a material of a higher strength than metal is preferable. However, considering material costs, the entire bushing may be made of a resin and the metal fastening guide may be used.

As another alternative to the above-described embodiments, the fastening guides may be injection molded together with the resin bushing, rather than provided as separate components.

In the motor described above, there is minimal clearance between the motor shaft and the bushing, and thus, an increased concentricity of the motor shaft and bushing, which allows a more accurate control of a washing machine due to a more accurate sensing of a Hall sensor signal.

Also, because the bushing and motor shaft remain fastened over a long period of time, vibration and noise of the washing machine can be reduced, and the product becomes more reliable.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to several exemplary embodiments, it is understood that the words that have been used are words of description and illustration, rather than words of limitation. As the present invention may be embodied in several forms without departing from the spirit or essential characteristics thereof, it should also be understood that the above-described embodiments are not limited by any of the details of the foregoing description, unless otherwise specified. Rather, the above-described embodiments should be construed broadly within the spirit and scope of the present invention as defined in the appended claims. Therefore, changes may be made within the metes and bounds of the appended claims, as presently stated and as amended, without departing from the scope and spirit of the invention in its aspects.

What is claimed is:

1. A motor comprising:
a stator; and
a rotor, wherein the rotor comprises:
a frame;
a bushing installed on the frame;
a motor shaft having an end which is inserted in and fixed to the bushing;
a fastening member which is inserted in the end of the motor shaft to fasten the motor shaft to the bushing; and
an outer fastening guide which is interposed between the fastening member and the end of the motor shaft,
wherein a portion of the outer fastening guide is interposed between a portion of a shaft of the fastening member and a portion of an inner surface of the motor shaft.

2. The motor according to claim 1, wherein another portion of the outer fastening guide is interposed between a head portion of the fastening member and an end surface of the motor shaft.

3. The motor according to claim 1, wherein another portion of the outer fastening guide is inserted in the end of the motor shaft.

4. The motor according to claim 1, wherein a portion of the fastening member is inserted in a hole in an end surface of the motor shaft.

5. The motor according to claim 1, wherein the outer fastening guide is injection molded with the bushing.

6. The motor according to claim 1, further comprising an inner fastening guide disposed at a side of the bushing opposite to a side at which the fastening member is disposed, a portion of the inner fastening guide being interposed between a portion of the motor shaft and a portion of the bushing.

7. The motor according to claim 1, wherein the outer fastening guide comprises a doughnut-shaped cap which is fitted between the bushing and the motor shaft.

* * * * *